(12) United States Patent
Kang (10) Patent No.: US 7,212,262 B2
(45) Date of Patent: May 1, 2007

(54) LIQUID CRYSTAL DISPLAY DEVICE AND METHOD OF FABRICATING THE SAME

(75) Inventor: Won-Seok Kang, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 133 days.

(21) Appl. No.: 11/017,773

(22) Filed: Dec. 22, 2004

(65) Prior Publication Data

US 2005/0134763 A1    Jun. 23, 2005

(30) Foreign Application Priority Data

Dec. 23, 2003   (KR) ................... 10-2003-0095730

(51) Int. Cl.
G02F 1/1335 (2006.01)
G02F 1/1339 (2006.01)

(52) U.S. Cl. .................. 349/106; 349/110; 349/122; 349/138; 349/155; 349/187

(58) Field of Classification Search ............... 349/106, 349/107, 108, 109, 110, 122, 138, 155, 156, 349/187; 430/5, 7, 321

See application file for complete search history.

(56) References Cited

U.S. PATENT DOCUMENTS

| | | | |
|---|---|---|---|
| 6,989,876 B2 * | 1/2006 | Song et al. | 349/109 |
| 2004/0125322 A1 * | 7/2004 | Sawasaki | 349/156 |
| 2004/0135937 A1 * | 7/2004 | Lee et al. | 349/106 |

* cited by examiner

*Primary Examiner*—Toan Ton
*Assistant Examiner*—Tai Duong
(74) *Attorney, Agent, or Firm*—Morgan, Lewis & Bockius LLP (57) ABSTRACT

A liquid crystal display device having a pixel, including red, green, blue and white sub-pixels, the device includes: red, green and blue color filters on a substrate, the red, green and blue color filters corresponding to the red, green and blue sub-pixels, respectively; an overcoat layer on a surface of the substrate in the white sub-pixel and also on the red, green and blue color filters; a planarization pattern on the overcoat layer corresponding to the white sub-pixel; and a column spacer on the overcoat layer.

14 Claims, 7 Drawing Sheets

LIQUID CRYSTAL DISPLAY DEVICE AND METHOD OF FABRICATING THE SAME

This application claims the benefit of Korean Patent Application No. 2003-0095730 filed in Korea on Dec. 23, 2003, which is hereby incorporated by reference.

BACKGROUND OF THE INVENTION

1. Field of the Invention

The present invention relates to a liquid crystal display (LCD) device and a method of fabricating the same, and more particularly, to a color filter substrate for an LCD device and a method of fabricating the same.

2. Discussion of the Related Art

A liquid crystal display (LCD) device is driven based on the optical anisotropy and birefringence characteristics of a liquid crystal material to display images. In general, the LCD device includes two substrates that are spaced apart and face each other, and a liquid crystal material layer interposed between the two substrates. Each of the substrates includes electrodes that face each other, wherein a voltage applied to each electrode induces an electric field perpendicular to the substrates between the electrodes. An alignment of liquid crystal molecules of the liquid crystal material layer changes by varying an intensity or direction of the applied electric field. Accordingly, the LCD device displays an image by varying light transmittance through the liquid crystal material layer in accordance with the arrangement of the liquid crystal molecules.

Figure 1:
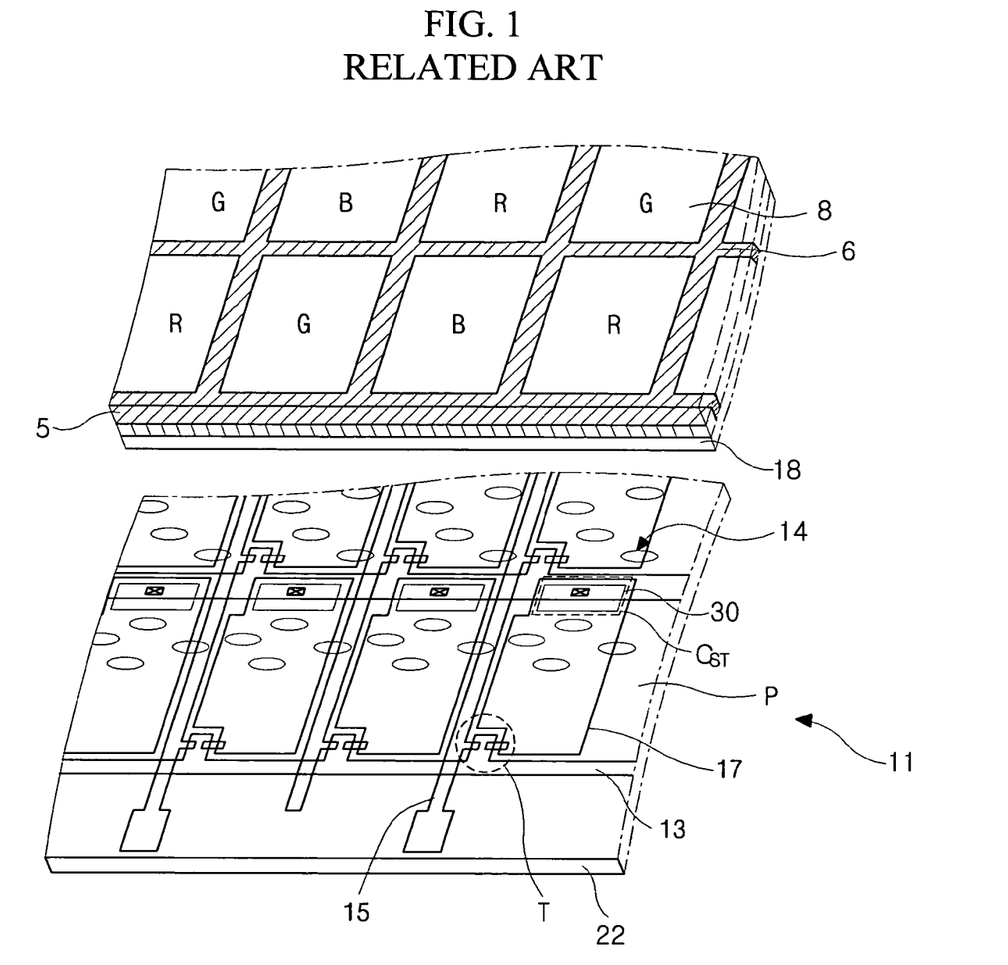
FIG. 1 is an expanded perspective view illustrating a related art LCD device.

FIG. 1 is an expanded perspective view illustrating the related art LCD device. As shown in FIG. 1, the LCD device 11 includes an upper substrate 5, referred to as a color filter substrate, and a lower substrate 22, referred to as an array substrate, having a liquid crystal material layer 14 interposed therebetween. On an inner surface of the upper substrate 5, a black matrix 6 and a color filter layer 8 are formed as an array matrix including a plurality of red (R), green (G), and blue (B) color filters surrounded by corresponding portions of the black matrix 6. Additionally, a common electrode 18 is formed on the upper substrate 5 to cover the color filter layer 8 and the black matrix 6.

On an inner surface of the lower substrate 22, a plurality of thin film transistors (TFTs) T are formed in the array matrix corresponding to the color filter layer 8. A plurality of gate lines 13 perpendicularly cross a plurality of data lines 15. The TFTs T are positioned such that each TFT T is located adjacent to an intersection of one of the gate lines 13 and one of the data lines 15. Furthermore, a pixel electrode 17 is formed on each of pixel regions P defined by the gate lines 13 and the data lines 15 of the lower substrate 22. The pixel electrode 17 includes a transparent conductive material having high transmittance, such as indium-tin-oxide (ITO) or indium-zinc-oxide (IZO).

As further shown in FIG. 1, a storage capacitor $C_{ST}$ is disposed in each pixel and connected in parallel to the pixel electrode 17 of the pixel. The storage capacitor $C_{ST}$ includes a portion of the gate line 13 as a first capacitor electrode and a metal layer 30 as a second capacitor electrode. Since the metal layer 30 is connected to the pixel electrode 17 through a contact hole, the storage capacitor $C_{ST}$ is electrically connected to the pixel electrode 17. The metal layer 30 may be made of the same material as the data line 15.

In the LCD device, a pixel is composed of three sub-pixels of red, green and blue. To improve brightness of the LCD device, a quad type LCD device, in which a pixel is composed of four sub-pixels of red, green, blue and white, has been suggested and been developed.

Figure 2:
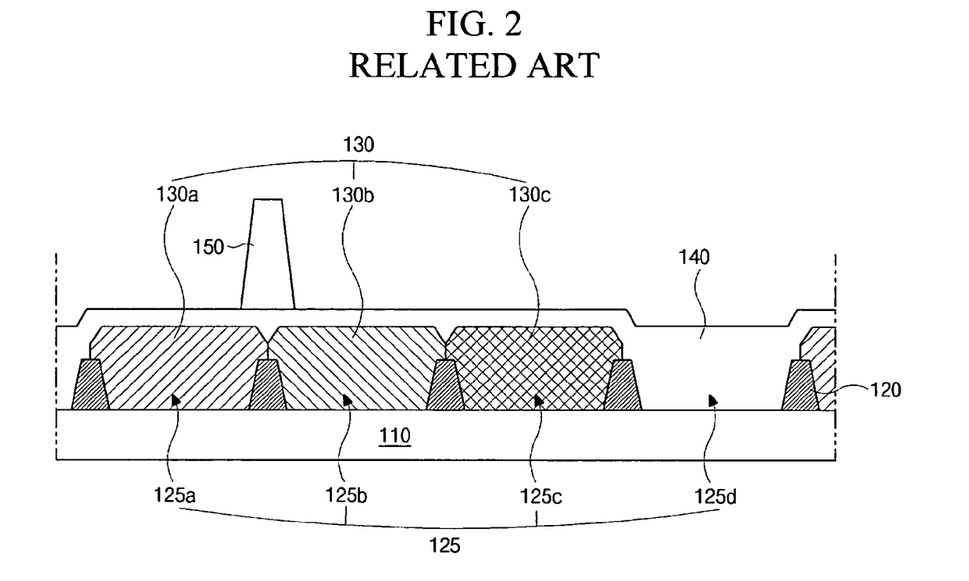
FIG. 2 is a cross-sectional view of a color filter substrate for an LCD device including red, green, blue and white sub-pixels according to the related art.

FIG. 2 is a cross-sectional view of a color filter substrate for an LCD device including red, green, blue and white sub-pixels according to the related art. In FIG. 2, a black matrix 120 having openings 125 is formed on a substrate 110. A color filter layer 130 is formed on the substrate 110 and corresponds to the openings 125 of the black matrix 120. An overcoat layer 140 is formed on the color filter layer 130, and a column spacer 150 is formed on the overcoat layer 140.

The black matrix 120 is formed of a light-blocking material and corresponds to gate lines, data lines and thin film transistors, which are formed on an array substrate facing the color filter substrate. Because liquid crystal molecules adjacent to the gate lines, data lines and the thin film transistors may be abnormally driven so as to cause light leakage, the black matrix blocks the light leakage. The black matrix 120 has first, second, third and fourth openings 125a, 125b, 125c and 125d for each pixel.

The color filter layer 130 includes red, green and blue color filters 130a, 130b and 130c, which are made of photosensitive materials for displaying red, green and blue colors, respectively. The red, green and blue color filters 130a, 130b and 130c correspond to the first, second and third openings 125a, 125b and 125c, respectively. There is no color filter corresponding to the fourth opening 125d.

The overcoat layer 140 serves as a planarization layer for flattening a surface of the substrate 110 including the color filter layer 130. The overcoat layer 140 is formed of a transparent organic material, for example, an acrylic material. The overcoat layer 140 covers the color filter layer 130 and fills the fourth opening 125d. Since there is no color filter corresponding to the fourth opening 125d, the overcoat layer 140 has a hollowed portion in a region corresponding to the fourth opening 125d.

A column spacer 150 is formed on the overcoat layer 140. The column spacer 150 maintains a cell gap between the color filter substrate and an array substrate, which are spaced apart from each other and face each other. The cell gap is filled with a liquid crystal material. Thus, the column spacer 150 determines the thickness of the liquid crystal layer between a top surface of the overcoat layer of the color filter substrate and a top surface of the array substrate.

The color filter substrate may be manufactured through processes of forming the black matrix on the substrate, forming the color filter layer of red, green and blue color filters, forming the overcoat layer, and forming the column spacer. There is a problem is that a surface of the overcoat layer is uneven because there is no color filter in the region for a white sub-pixel. Thus, the thickness of the liquid crystal layer or the cell will be varied.

Figure 3:
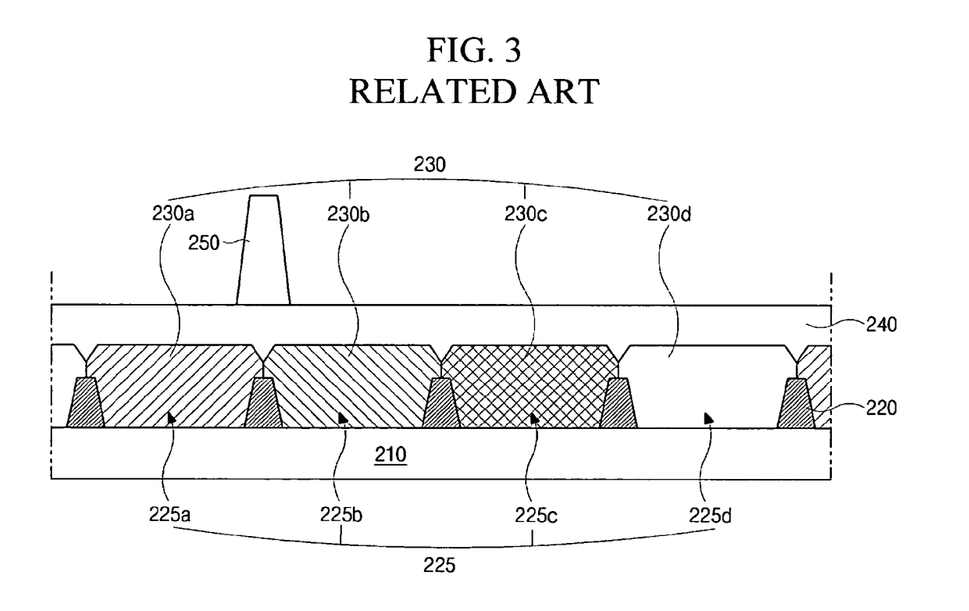
FIG. 3 is a cross-sectional view of another color filter substrate according to the related art.

FIG. 3 is a cross-sectional view of another color filter substrate according to the related art. In FIG. 3, red, green, blue and white color filters 230a, 230b, 230c and 230d are formed on a substrate 210 and corresponds to first, second, third and fourth openings 225a, 225b, 225c and 225d of a black matrix 220. The white color filter 230d is substantially formed of a transparent material and transmits white light therethrough. The red, green, blue and white color filters 230a, 230b, 230c and 230d may have substantially the same thickness. An overcoat layer 240 is formed on the red, green, blue and white color filters 230a, 230b, 230c and 230d, and a column spacer 250 is formed on the overcoat layer 240. Accordingly, the overcoat layer 240 has an even surface such that the cell gap will be uniform or a subsequently formed liquid crystal layer will have a uniform thickness.

However, a process for forming the white color filter is added, and thus the color filter substrate of FIG. 3 is manufactured through more processes than the color filter substrate of FIG. 2.

SUMMARY OF THE INVENTION

Accordingly, the present invention is directed to an LCD device and a method of fabricating an LCD device that substantially obviates one or more problems due to limitations and disadvantages of the related art.

An object of the present invention is to provide an LCD device and a method of fabrication the same that has a uniform cell gap.

Another object of the present invention is to provide an LCD device and a method of fabrication the same for a color filter substrate with a flat surface without additional color filter fabrication processes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device having a pixel, including red, green, blue and white sub-pixels, the liquid crystal display device includes: red, green and blue color filters on a substrate, the red, green and blue color filters corresponding to the red, green and blue sub-pixels, respectively; an overcoat layer on a surface of the substrate in the white sub-pixel and also on the red, green and blue color filters; a planarization pattern on the overcoat layer corresponding to the white sub-pixel; a column spacer on the overcoat layer.

In another aspect, a method of fabricating a liquid crystal display device having a pixel, the pixel includes red, green, blue and white sub-pixels, the device includes: red, green and blue color filters on a color filter substrate, the red, green and blue color filters corresponding to the red, green and blue sub-pixels, respectively; an overcoat layer on a surface of the color filter substrate in the white sub-pixel and also on the red, green and blue color filters, the overcoat layer having a hollowed portion corresponding to the white sub-pixel; a planarization pattern on the overcoat layer that fills the hollowed portion of the overcoat layer; and a column spacer on the overcoat layer corresponding to the black matrix.

In another aspect, a liquid crystal display device having a pixel, including red, green, blue and white sub-pixels divided by a black matrix, the device includes: red, green and blue color filters on a color filter substrate, the red, green and blue color filters corresponding to the red, green and blue sub-pixels, respectively; an overcoat layer on a surface of the color filter substrate in the white sub-pixel and also on the red, green and blue color filters, the overcoat layer having a hollowed portion corresponding to the white sub-pixel; a planarization pattern on the overcoat layer that fills the hollowed portion of the overcoat layer; and a column spacer on the overcoat layer corresponding to the black matrix.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
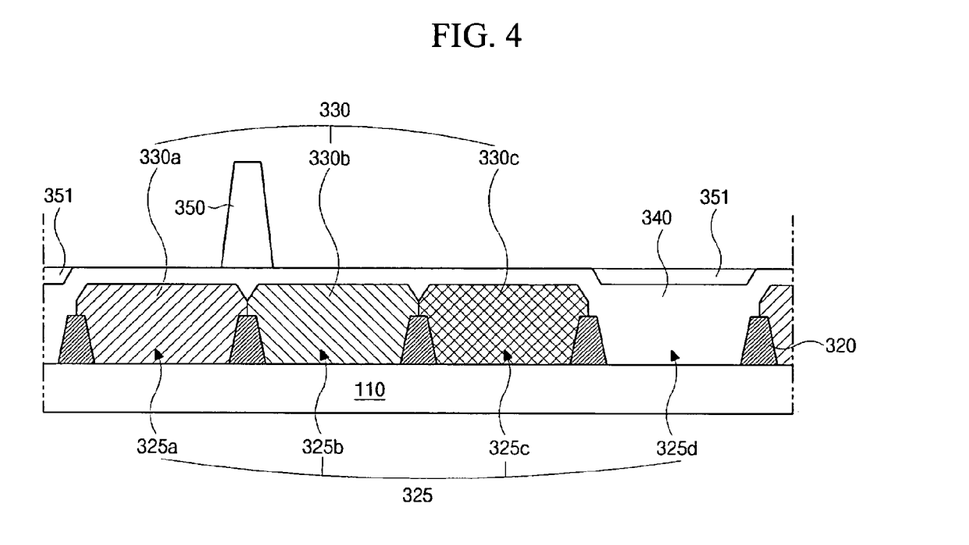
FIG. 4 is a cross-sectional view of a color filter substrate for an LCD device according to an embodiment of the present invention.

FIG. 4 is a cross-sectional view of a color filter substrate for an LCD device according to an embodiment of the present invention. As shown in FIG. 4, a black matrix 320 having openings 325 is formed on a substrate 310. A color filter layer 330 is formed on the substrate 310 and corresponds to the openings 325 of the black matrix 320. An overcoat layer 340 is formed on the color filter layer 330. A column spacer 350 and a planarization pattern 351 are formed on the overcoat layer 340.

The black matrix 320 is formed of a light-blocking material and corresponds to gate and data lines and thin film transistors, which are not shown in FIG. 4 and are formed on a substrate facing the color filter substrate. Because liquid crystal molecules adjacent to the gate lines, data lines and the thin film transistors may be abnormally driven so as to cause light leakage, the black matrix blocks the light leakage. The black matrix 320 has first, second, third and fourth openings 325a, 325b, 325c and 325d. The first, second, third and fourth openings 325a, 325b, 325c and 325d correspond to red, green, blue and white sub-pixels, respectively, which constitute a pixel.

The color filter layer 330 includes red, green and blue color filters 330a, 330b and 330c, which are made of photosensitive materials for displaying red, green and blue colors, respectively. The red, green and blue color filters 330a, 330b and 330c correspond to the first, second and third openings 325a, 325b and 325c, respectively. There is no color filter corresponding to the fourth opening 325d.

The overcoat layer 340 serves as a planarization layer for flattening a surface of the substrate 310 including the color filter layer 330. The overcoat layer 340 is formed of a transparent organic material, for example, an acrylic material. The overcoat layer 340 covers the color filter layer 330 and fills the fourth opening 325d. Since there is no color filter corresponding to the fourth opening 325d, the overcoat layer 340 has a hollowed portion in a region corresponding to the fourth opening 325d.

The column spacer 350 and the planarization pattern 351 are formed on the overcoat layer 340. The column spacer 350 corresponds to the black matrix 320. The planarization pattern 350 corresponds to the fourth opening 325d. The column spacer 350 and the planarization pattern 351 are formed of a transparent organic material such as benzocyclobutene (BCB), photo acryl, cytop, and perfluorocyclobutene (PFCB).

The column spacer 350 maintains a cell gap between the color filter substrate and an array substrate, which are spaced apart from each other and face each other. The cell gap is filled with a liquid crystal material. Thus, the column spacer 350 determines the thickness of the liquid crystal layer between an upper surface, including the top surfaces of the both overcoat layer 340 and the planarization pattern 351, and the upper surface of an array substrate. As stated above, the planarization pattern 351 is formed on the overcoat layer 340 in a region corresponding to the fourth opening 325d and fills the hollowed portion of the overcoat layer 340, to thereby flatten the upper surface of both the overcoat layer 340 and the planarization pattern 351.

Figure 5A:
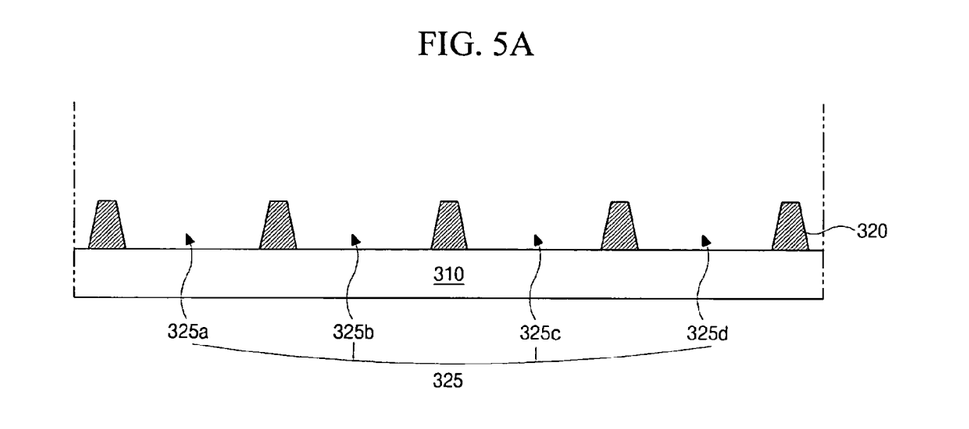
FIGS. 5A to 5H are cross-sectional views showing an exemplary fabrication process of a color filter substrate according to an embodiment of the present invention.

FIGS. 5A to 5H are cross-sectional views showing an exemplary fabrication process of a color filter substrate according to an embodiment of the present invention. As shown in FIG. 5A, a black matrix 320 is formed on a substrate 310 by coating a light-blocking material and then patterning it though a mask process. The black matrix 320 has first, second, third and fourth openings 325a, 325b, 325c and 325d, which correspond to red, green, blue and white sub-pixels, respectively. The red, green, blue and white sub-pixels constitute a pixel for displaying an image. The black matrix 320 corresponds to metal patterns, such as gate and data lines, which are not shown in FIG. 5A, that are formed on an array substrate facing the color filter substrate 310.

Figure 5B:
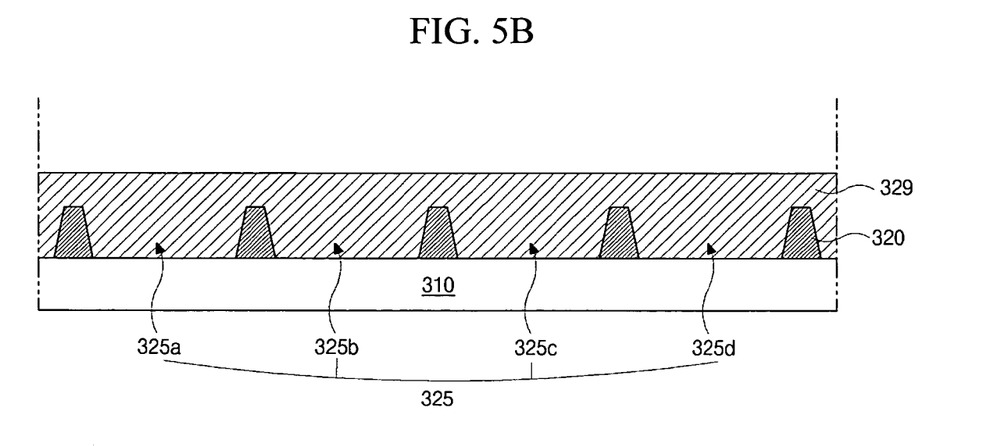

As shown in FIG. 5B, a red color resin 329 is coated on the color filter substrate 310 including the black matrix 320. The red color resin 329 is photosensitive.

Figure 5C:
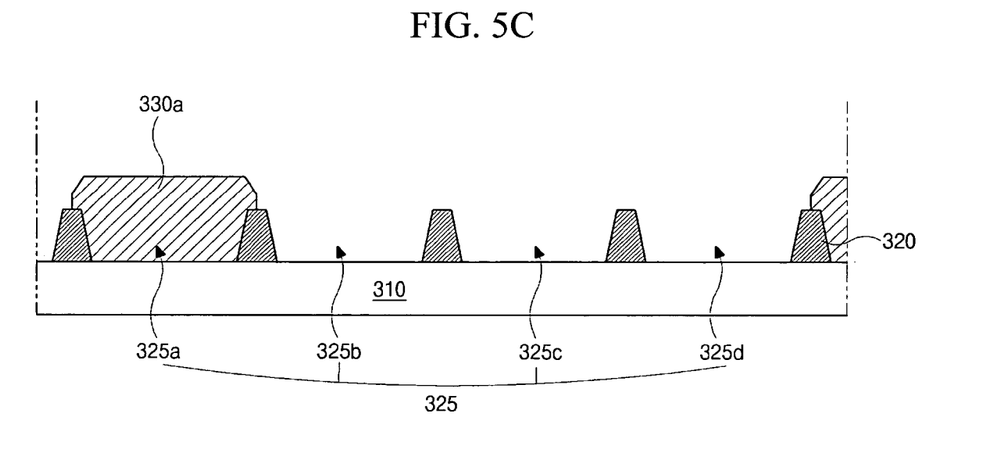

Next, as shown in FIG. 5C, a red color filter 330a is formed in the first opening 325a of the black matrix 320 to patterning the red color resin 329 through a mask process.

Figure 5D:
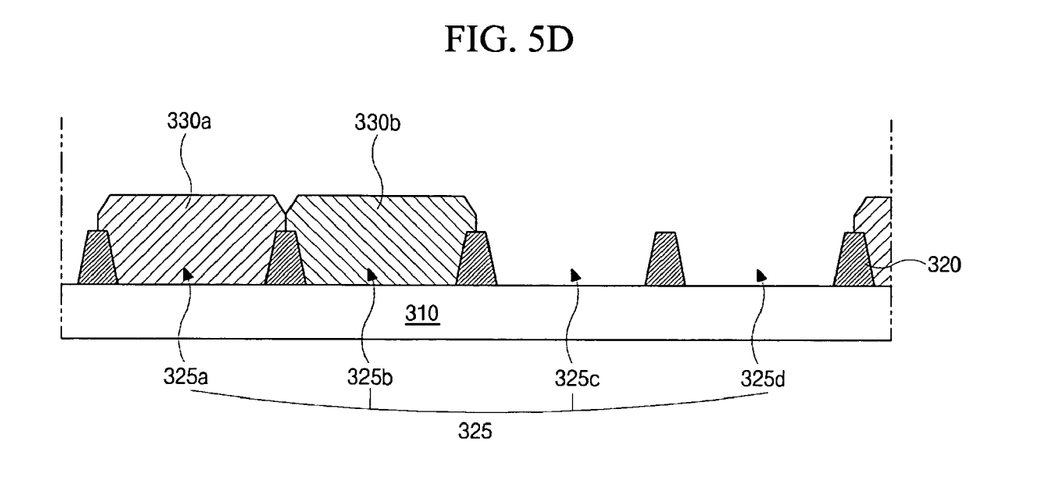

Subsequently, as shown in FIG. 5D, a green color filter 330b is formed in the second opening 325b by coating a green color resin and then patterning the green color resin through a mask process. The green color filter 330b is formed using the same process as the red color filter 330a.

Figure 5E:
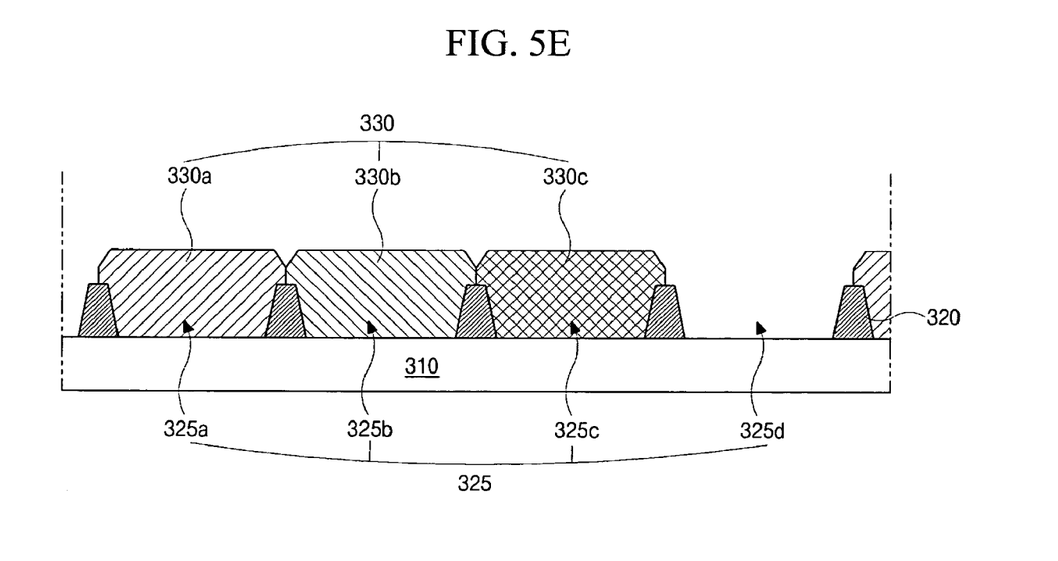

As shown in FIG. 5E, a blue color filter 330c is then formed in the third opening 325c by coating a blue color resin and then patterning the blue color resin through a mask process. The blue color filter 330c is also formed using the same process as the red color filter 330a and/or the green color filter 330b.

The color filter 330, which includes the red, green and blue color filters 330a, 330b and 330c, can cover the black matrix 320.

Figure 5F:
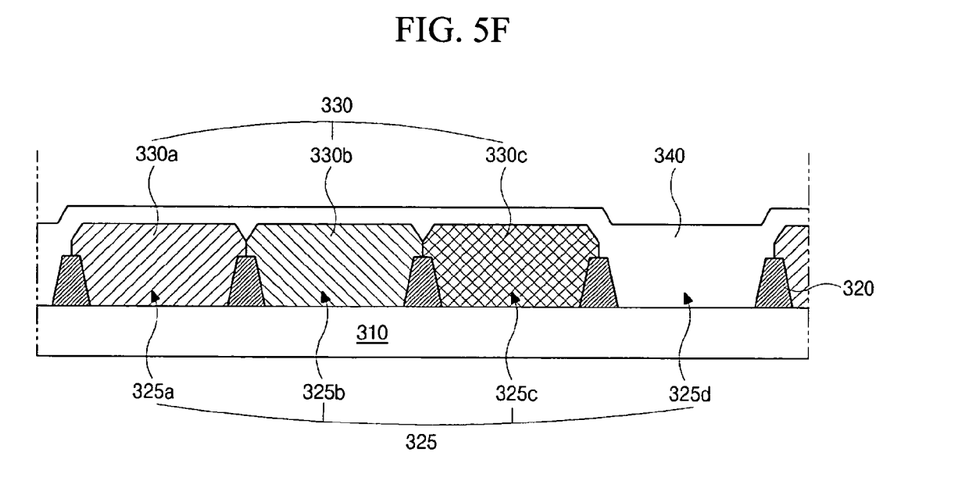

Next, as shown in FIG. 5F, an overcoat layer 340 is formed on the substrate 310 including the red, green and blue color filters 330a, 330b and 330c by a coating method. The overcoat layer 340 covers the color filter 330 and fills the fourth opening 325d. Since there is no color filter in the fourth opening 325d, the overcoat layer 340 has a resulting hollowed portion in a region corresponding to the fourth opening 325d as compared to other portions of the overcoat layer 340 over the color filters 330a, 330b and 330c.

Figure 5G:
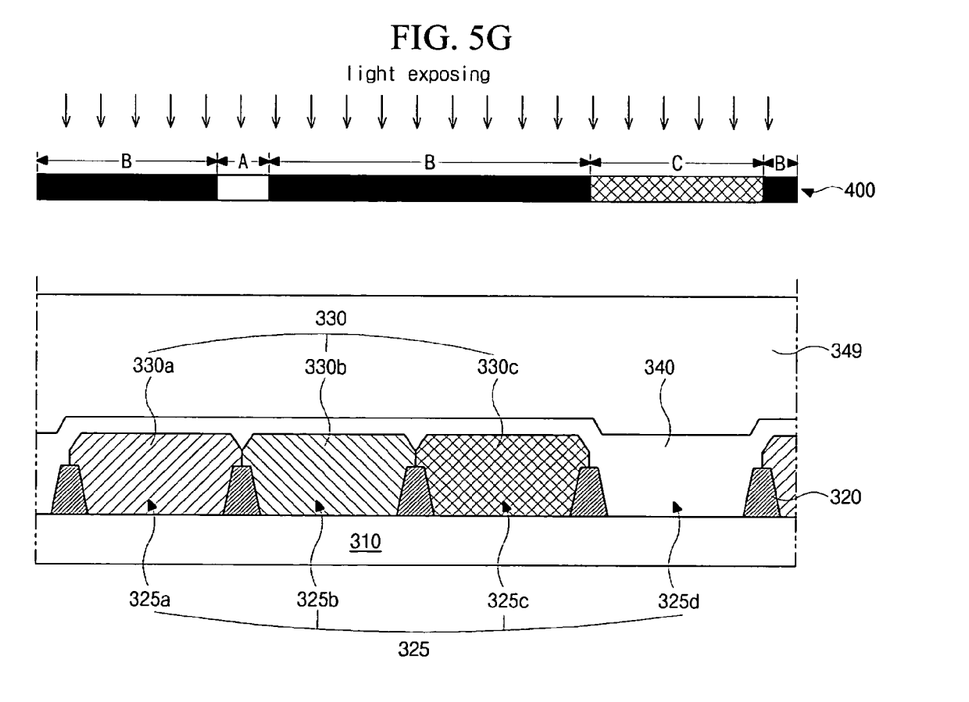

As shown in FIG. 5G, an organic layer 349 is formed on the overcoat layer 340 by a coating method, and then a mask 400 is disposed over the organic layer 349. An exposing process is then performed. For example, photosensitive photo acryl may be used as a material for the organic layer 349, and the photo acryl may be negative type in that a portion not exposed to light is removed.

The mask 400 includes a transmitting portion A that transmits light, a blocking portion B that blocks light, and a partial transmitting portion C that partly blocks light. The transmitting portion A corresponds to a region where a column spacer will be formed, and the partial transmitting portion C corresponds to a region where a planarization will be formed. That is, the transmitting portion A corresponds to a part of the black matrix 320, and the half transmitting portion C corresponds to the fourth opening 325d.

Figure 5H:
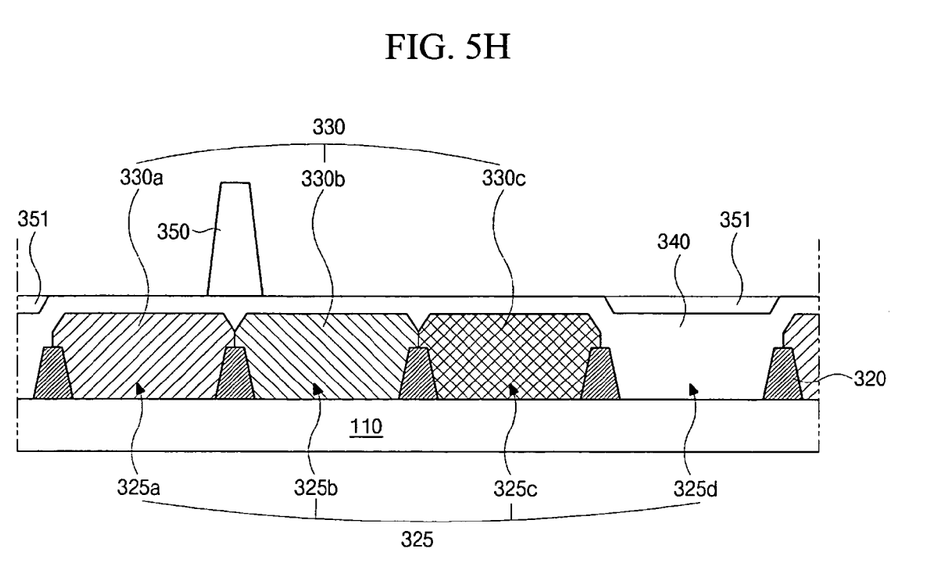

As shown in FIG. 5H, a column spacer 350 and a planarization pattern 351 are then formed by developing the organic layer 349 of FIG. 5G after the exposing process. The planarization pattern 351 has a thinner thickness than the column spacer 350, and the planarization pattern 351 together with the overcoat layer 340 creates a flat upper surface. Thus, the organic layer 349 of FIG. 5G is disposed so that a top surface of the planarization pattern 351 is at the same level as a top surface of the overcoat layer 340.

Alternatively, the photo acryl can be positive type. Thus, the transmitting portion and the blocking portion are switched and the partial transmitting portion is adjusted accordingly for a positive type material. If the organic layer can not be photosensitive, the column spacer and the planarization layer may be formed by sequentially performing exposing, developing, etching and striping processes after coating photoresist on the organic layer.

Through the processes described above, the color filter substrate in embodiments of the present invention is fabricated. The color filter substrate can be attached to an array substrate, and then a liquid crystal layer is positioned between the color filter substrate and the array substrate to thereby manufacture an LCD device. Thus, in embodiments of the present invention, a color filter for a white sub-pixel is not formed, and a planarization pattern is formed on an overcoat layer using the same process as a column spacer. Therefore, an upper surface on a color filter substrate can be fabricated to be flat without additional process steps.

It will be apparent to those skilled in the art that various modifications and variations can be made in the liquid crystal display device and method of fabricating an LCD device of the present invention without departing from the spirit or scope of the invention. Thus, it is intended that the present invention cover the modifications and variations of this invention provided they come within the scope of the appended claims and their equivalents.

What is claimed is:

1. A liquid crystal display device having a pixel, including red, green, blue and white sub-pixels, the device comprising:
   red, green and blue color filters on a substrate, the red, green and blue color filters corresponding to the red, green and blue sub-pixels, respectively;
   an overcoat layer on a surface of the substrate in the white sub-pixel and also on the red, green and blue color filters;
   a planarization pattern on the overcoat layer corresponding to the white sub-pixel; and
   a column spacer on the overcoat layer,
   wherein the planarization pattern and the overcoat layer create a flat top surface.

2. The device according to claim 1, wherein the overcoat layer has a hollowed portion corresponding to the white sub-pixel, and the planarization pattern fills the hollowed portion of the overcoat layer.

3. The device according to claim 1, wherein the planarization pattern is formed of the same material and in the same layer as the column spacer.

4. The device according to claim 1, further comprising a black matrix having first, second, third and fourth openings, wherein the first, second, third and fourth openings correspond to the red, green, blue and white sub-pixels, respectively.

5. A method of fabricating a liquid crystal display device having a pixel, including red, green, blue and white sub-pixels, the method comprising:
   forming red, green and blue color filters on a substrate, the red, green and blue color filters corresponding to the red, green and blue sub-pixels, respectively;
   forming an overcoat layer on a surface of the substrate in the white sub-pixel and also on the red, green and blue color filters;
   forming a planarization pattern on the overcoat layer corresponding to the white sub-pixel; and
   forming a column spacer on the overcoat layers
   wherein the planarization pattern and the overcoat layer create a flat top surface.

6. The method according to claim 5, wherein forming the column spacer and forming the planarization pattern includes:
   forming an organic layer on the overcoat layer;
   exposing the organic layer to light; and
   developing the exposed organic layer to form the planarization pattern and the column spacer, the planarization pattern having a thinner thickness than the column spacer.

7. The method according to claim 6, wherein the organic layer is negative type that a portion not exposed to light is removed.

8. The method according to claim 7, wherein the organic layer is a photo acrylic material.

9. The method according to claim 6, wherein exposing the organic layer uses a mask including a transmitting portion, a blocking portion and a partial transmitting portion, and wherein the partial transmitting portion corresponds to the white sub-pixel, and the transmitting portion corresponds to a region where the column spacer is formed.

10. The method according to claim 5, wherein the overcoat layer has a hollowed portion corresponding to the white sub-pixel, and the planarization pattern fills the hollowed portion of the overcoat layer.

11. The method according to claim 5, further comprising forming a black matrix having first, second, third and fourth openings, wherein the first, second, third and fourth openings correspond to the red, green, blue and white sub-pixels, respectively.

12. A liquid crystal display device having a pixel, including red, green, blue and white sub-pixels divided by a black matrix, the device comprising:
   red, green and blue color filters on a color filter substrate, the red, green and blue color filters corresponding to the red, green and blue sub-pixels, respectively;
   an overcoat layer on a surface of the color filter substrate in the white sub-pixel and also on the red, green and blue color filters, the overcoat layer having a hollowed portion corresponding to the white sub-pixel;
   a planarization pattern on the overcoat layer that fills the hollowed portion of the overcoat layer; and
   a column spacer on the overcoat layer corresponding to the black matrix,
   wherein the planarization pattern and the overcoat layer create a flat top surface.

13. The device according to claim 12, wherein the planarization pattern is formed of the same material and in the same layer as the column spacer.

14. A liquid crystal display device having a pixel, including red, green, blue and white sub-pixels, the device comprising:
   red, green and blue color filters on a substrate, the red, green and blue color filters corresponding to the red, green and blue sub-pixels, respectively;
   an overcoat layer on a surface of the substrate in the white sub-pixel and also on the red, green and blue color filters;
   a planarization pattern on the overcoat layer corresponding to the white sub-pixel; and
   a column spacer on the overcoat layer,
   wherein the planarization pattern is formed of the same material and in the same layer as the column spacer.

* * * * *